US009511938B2

(12) United States Patent  
Reischl (10) Patent No.: US 9,511,938 B2  
(45) Date of Patent: Dec. 6, 2016

(54) CONVEYOR SYSTEM HAVING SUBSTANTIALLY SYMMETRICAL LONGITUDINALLY RUNNING ELECTRIC CONDUCTORS

(71) Applicant: TGW Mechanics GmbH, Wels (AT)

(72) Inventor: Josef Reischl, Gunskirchen (AT)

(73) Assignee: TGW Mechanics GmbH, Wels (AT)

( * ) Notice: Subject to any disclaimer, the term of this patent is extended or adjusted under 35 U.S.C. 154(b) by 0 days.

(21) Appl. No.: 15/028,061

(22) PCT Filed: Oct. 10, 2014

(86) PCT No.: PCT/AT2014/050240  
§ 371 (c)(1),  
(2) Date: May 24, 2016

(87) PCT Pub. No.: WO2015/051390  
PCT Pub. Date: Apr. 16, 2015

(65) Prior Publication Data  
US 2016/0280463 A1    Sep. 29, 2016

(30) Foreign Application Priority Data  
Oct. 11, 2013   (AT) .............................. A 50654/2013

(51) Int. Cl.  
*B65G 13/06*   (2006.01)  
*B65G 13/11*   (2006.01)  
*B65G 13/02*   (2006.01)

(52) U.S. Cl.  
CPC .............. *B65G 13/11* (2013.01); *B65G 13/02* (2013.01)

(58) Field of Classification Search  
CPC .......... B65G 23/08; B65G 23/10; B65G 13/06  
(Continued)

(56) References Cited

U.S. PATENT DOCUMENTS 1,725,740 A * 8/1929 Schulte ................. B21B 39/008  
198/788  
4,241,825 A   12/1980 Brouwer  
(Continued)

FOREIGN PATENT DOCUMENTS

DE         957 376 C   1/1957  
DE   20 2004 020 677 U1   11/2005  
(Continued)

OTHER PUBLICATIONS

International Search Report of PCT/AT2014/050240, mailed Feb. 13, 2015.  
(Continued)

*Primary Examiner* — James R Bidwell  
(74) *Attorney, Agent, or Firm* — Collard & Roe, P.C.

(57) ABSTRACT

The invention relates to a conveyor system (1), comprising two frame profiles (2, 3) which are run such that they are spaced apart from one another, a plurality of motorized conveyor rollers (4) which are arranged in between, an insulator (19) which runs along the at least one frame profile (2) with a plurality of receptacles which are open on the longitudinal side, and a plurality of electric conductors (20) which are arranged in the insulator (19) and are electrically connected to drive electronics of the conveyor rollers (4), and in each case one electric conductor (20) is mounted in each case in one receptacle. The form factor f of an electric conductor (20), which is defined as a quotient of the circumference of a circle which is equivalent in area to the cross section of the electric conductor (20) and of the circumference of said cross section of the electric conductor (20), is selected in the range of from f=0.88 to f=1.00.

8 Claims, 10 Drawing Sheets

(58) Field of Classification Search
USPC ..................................... 198/788, 789, 860.1
See application file for complete search history.

(56) References Cited

U.S. PATENT DOCUMENTS

| | | | |
|---|---|---|---|
| 4,832,185 A | | 5/1989 | Huber |
| 5,022,513 A | * | 6/1991 | Huber .................. B65G 13/065 198/782 |
| 5,442,248 A | * | 8/1995 | Agnoff .................. B65G 23/08 310/67 R |
| 6,367,617 B1 | | 4/2002 | Schiesser et al. |
| 6,672,449 B2 | * | 1/2004 | Nakamura ............. B65G 23/08 198/788 |
| 6,718,101 B2 | | 4/2004 | Le Noane et al. |
| 6,726,003 B2 | | 4/2004 | Itoh et al. |
| 7,035,714 B2 | | 4/2006 | Anderson et al. |
| 8,307,976 B2 | | 11/2012 | Kraetz et al. |
| 2001/0037929 A1 | | 11/2001 | Bond, Jr. et al. |
| 2004/0035684 A1 | * | 2/2004 | Fukuoka ............... B65G 13/06 198/788 |
| 2004/0163934 A1 | * | 8/2004 | Kanaris ................. B65G 23/08 198/783 |
| 2004/0195078 A1 | | 10/2004 | Anderson et al. |
| 2007/0187132 A1 | | 8/2007 | Watt |
| 2009/0166157 A1 | * | 7/2009 | Kratz .................... B65G 23/08 198/788 |

FOREIGN PATENT DOCUMENTS

| | | |
|---|---|---|
| DE | 10 2004 043 197 A1 | 3/2006 |
| DE | 10 2010 002758 A1 | 9/2011 |
| EP | 0 300 128 A1 | 1/1989 |
| EP | 1 285 869 A2 | 2/2003 |
| EP | 1 285 869 A2 | 6/2003 |
| EP | 1 222 125 B1 | 10/2005 |
| EP | 2 455 310 A1 | 5/2012 |
| FR | 2 810 747 A1 | 12/2001 |
| GB | 2 435 124 A | 8/2007 |
| JP | S52-8882 U | 1/1977 |
| JP | S60-122615 A | 7/1985 |
| JP | H04-144812 A | 5/1992 |
| JP | H10-181829 A | 7/1998 |
| JP | 2000-247423 A | 9/2000 |
| JP | 2003-051362 A | 2/2003 |
| JP | 2010-235292 A | 10/2010 |
| WO | 2004/067416 A1 | 8/2004 |
| WO | 2007/036421 A1 | 4/2007 |
| WO | 2011/029120 A1 | 3/2011 |
| WO | 2011/032196 A1 | 3/2011 |
| WO | 2012/094690 A1 | 7/2012 |
| WO | 2013-000006 A2 | 1/2013 |

OTHER PUBLICATIONS

International Search Report of PCT/AT2014/050241, mailed Feb. 17, 2015.
International Search Report of PCT/AT2014/050242, mailed Feb. 18, 2015.
Response to European Patent Office in PCT/AT2014/050240, dated Sep. 4, 2016, with English translation of relevant parts.
Response to European Patent Office in PCT/AT2014/050241, dated Nov. 24, 2015, with English translation of relevant parts.
Response to European Patent Office in PCT/AT2014/050242, dated Aug. 6, 2015, with English translation of relevant parts.
Response to European Patent Office in PCT/AT2014/050265, dated Sep. 4, 2015, with English translation of relevant parts.
International Search Report in .PCT/AT2014/050265, dated May 11, 2015.

* cited by examiner

CONVEYOR SYSTEM HAVING SUBSTANTIALLY SYMMETRICAL LONGITUDINALLY RUNNING ELECTRIC CONDUCTORS

CROSS REFERENCE TO RELATED APPLICATIONS

This application is the National Stage of PCT/AT2014/050240 filed on Oct. 10, 2014, which claims priority under 35 U.S.C. §119 of Austrian Application No. A 50654/2013 filed on Oct. 11, 2013, the disclosure of which is incorporated by reference. The international application under PCT article 21(2) was not published in English.

The invention relates to a conveyor system, comprising two frame profiles extending at a distance apart from one another, a plurality of motorized conveyor rollers which are arranged in between, an insulator which runs along the at least one frame profile with a plurality of receptacles for electric conductors which are open on the longitudinal side and a plurality of electric conductors which are arranged in the insulator and are electrically connected to drive electronics of the conveyor rollers, and one electric conductor is mounted in each case in one receptacle.

Such a conveyor system is known in principle. The electric conductors form a power supply bus and/or data bus which can be contacted in order to pick up electrical energy and/or data signals between a power supply respectively a controller for the motorized rollers.

To this end, EP 0 300 128 A1 discloses a roller conveyor track, for example, in the side walls of which rectangular conductor bars are embedded in an upright position. At specific points, said conductor bars are run on the surface of the side walls. From here, the motorized rollers can be supplied with electrical energy via electrical contacts which contact the conductor bars.

The disadvantage of this arrangement is that the motorized rollers can only be mounted at specific positions, namely where the conductor bars are run at the surface of the side walls.

Another disadvantage is the fact that it is difficult to obtain curved contours of the conveyor track, rising sections thereof and helical contours (rising, curved contours) of the conveyor track with the proposed system used in EP 0 300 128 A1.

Accordingly, one objective of the invention is to propose an improved conveyor system. In particular, it should also be possible to obtain more complex contours of the conveyor track more easily and use the motorized rollers flexibly.

The objective is achieved by the invention on the basis of a conveyor system of the type outlined above, where the form factor f of an electric conductor, which is defined as the quotient of the circumference of a circle which is equivalent in area to the cross section of the electric conductor and of the circumference of said cross section of the electric conductor, is in the range of from $f=0.88$ to $f=1.00$.

This makes it much easier to obtain more complex contours of the conveyor track, i.e. curved contours, rising sections and helical contours in particular, because the electric conductors essentially exhibit the same bending behavior in all directions. In particular, the section modulus in the x direction and y direction is the same or more or less the same. Furthermore, the motorized rollers can be used flexibly because the electric conductors can be contacted practically across their entire contour. In this connection, it is expedient to make the insulator from a material that bends easily. In particular, it is of advantage if the insulator is made from PVC-U and/or from a material with a modulus of elasticity of around 2900 N/mm².

Other advantageous embodiments and features of the invention may be found in the dependent claims and the description of the drawings.

It is of practical advantage if the cross section of an electric conductor is polygonal, in particular of a regular polygonal shape. The cross section of an electric conductor may therefore be rectangular or also approximately square or square, hexagonal or octagonal, in particular.

It is of practical advantage if the cross section of an electric conductor is oval, in particular circular. In particular, the cross section of an electric conductor may therefore be oval or alternatively approximately circular or circular.

It is of advantage if the electrical connection to the drive electronics of the conveyor rollers is established with the aid of spring-loaded contacts lying on one side of the electric conductors. This means that contacts of a simple design can be used to provide the electrical contact to the drive electronics. In particular, these contacts may be disposed in a special connection box separate from the conveyor roller. The connection box may also contain said drive electronics. However, the latter may also be disposed directly in the conveyor roller.

It is also of advantage if a plurality of sections of electric conductors is electrically connected with the aid of spring-loaded contacts extending round the electric conductors. In this manner, resistance can be kept low and relatively large currents can be directed via said contacts. In this connection, it is of particular advantage if several contacts lying in a spring-loaded and local, linear or flat arrangement are provided for each electric conductor. By using a plurality of contacts one after the other in the longitudinal direction of the electric conductor, contact can still be made even if irregularities occur in the run of the electric conductor or if the power supply bus is run on a curve, e.g. in a curve of the conveyor track.

In this connection, it is of particular advantage if the contacts each have several contact blades extending transversely to the electric conductor and spaced apart from one another in the longitudinal direction thereof. This enables electrical resistance to be reduced because the contact blades are effectively able to compensate for any unevenness and electrically act in the manner of individual contacts connected in parallel.

To provide a clearer understanding, the invention will be described in more detail below with reference to the drawings.

Of these.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10

Figure 1:
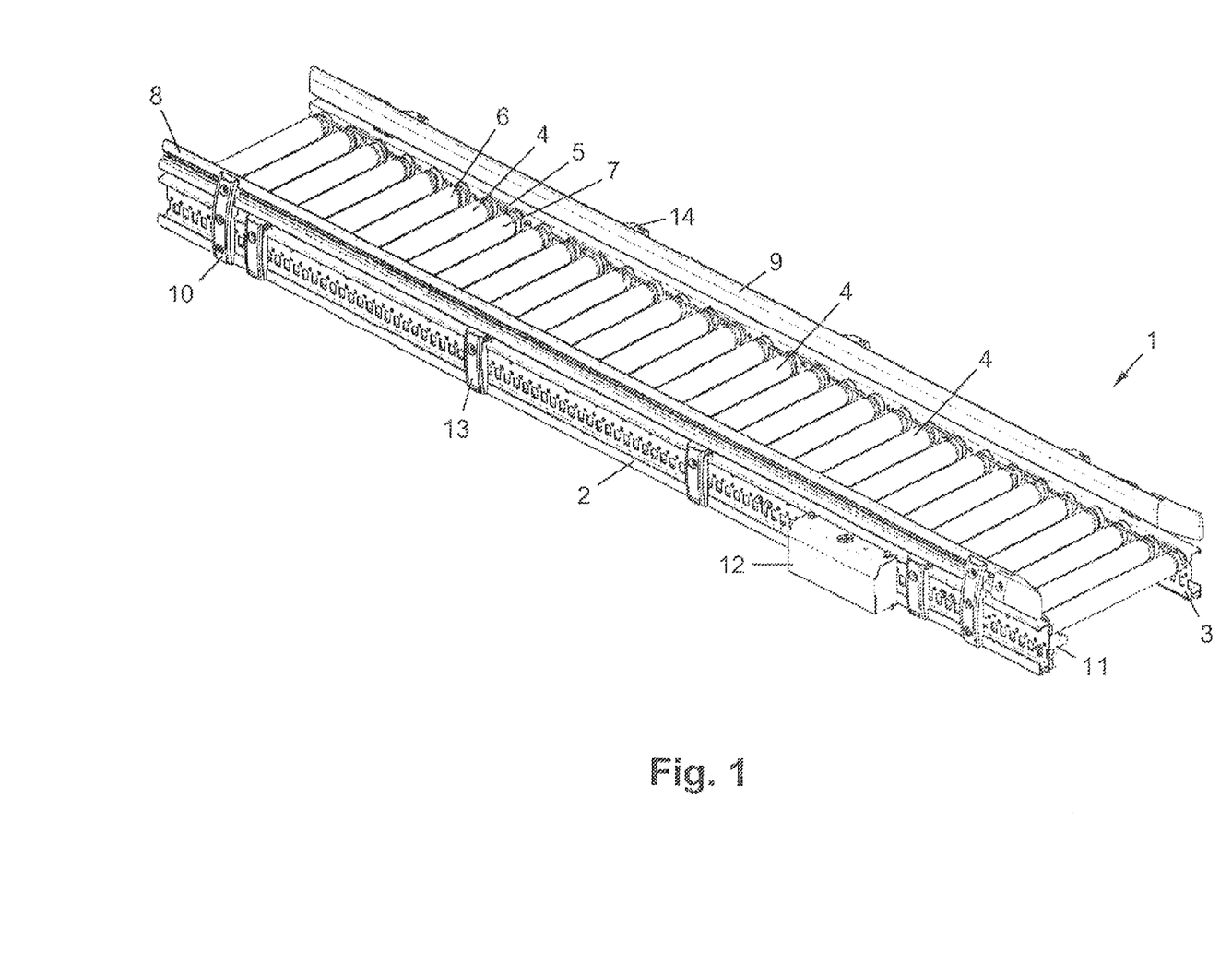
FIG. 1 illustrates an exemplary detail of a conveyor system 1 viewed at an angle from above.

FIG. 1 illustrates an exemplary detail of a conveyor system 1 viewed at an angle from above. The conveyor system for conveying objects (e.g. containers, trays, boxes) comprises two frame profiles 2 and 3 extending at a distance apart from one another and a plurality of motorized conveyor rollers 4 arranged in between. By means of drive belt 5, other non-motorized conveyor rollers 6 and 7 can also be driven. It is naturally not absolutely a condition for all of the conveyor rollers of the conveyor system 1 to be directly or indirectly driven and instead it would also be possible for idle rollers to be provided between the frame profiles 2 and 3. It would also be conceivable for a conveyor belt or band to be placed over the conveyor rollers 4, 6, 7. In particular in this respect, the motorized conveyor roller 4 may be disposed at the end of the conveyor belt or band because the angle of wrap of the belt or band is large there. The motorized conveyor roller 4 then constitutes a drive roller. A separate drive belt 5 can be dispensed with if using a belt or band. This being the case, a conveyor surface for objects is not formed by the motorized conveyor roller 4 but by a top strand of the conveyor belt or band.

The conveyor system 1 further comprises optional guide rails 8 and 9 which are secured to the frame profiles 2 and 3 by means of mounting brackets 10. These are used to improve lateral guidance for objects conveyed on the conveyor system 1, e.g. containers, trays and boxes.

The motorized conveyor rollers 4 are connected a power supply bus and a data bus via connection boxes 11. The conveyor rollers 4 are controlled by means of the controller 12. Photodetectors 13 may also be provided in the contour of the frame profiles 2 and 3 in order to detect objects being conveyed. In this example, oppositely lying reflectors 14 are provided in addition.

Figure 2:
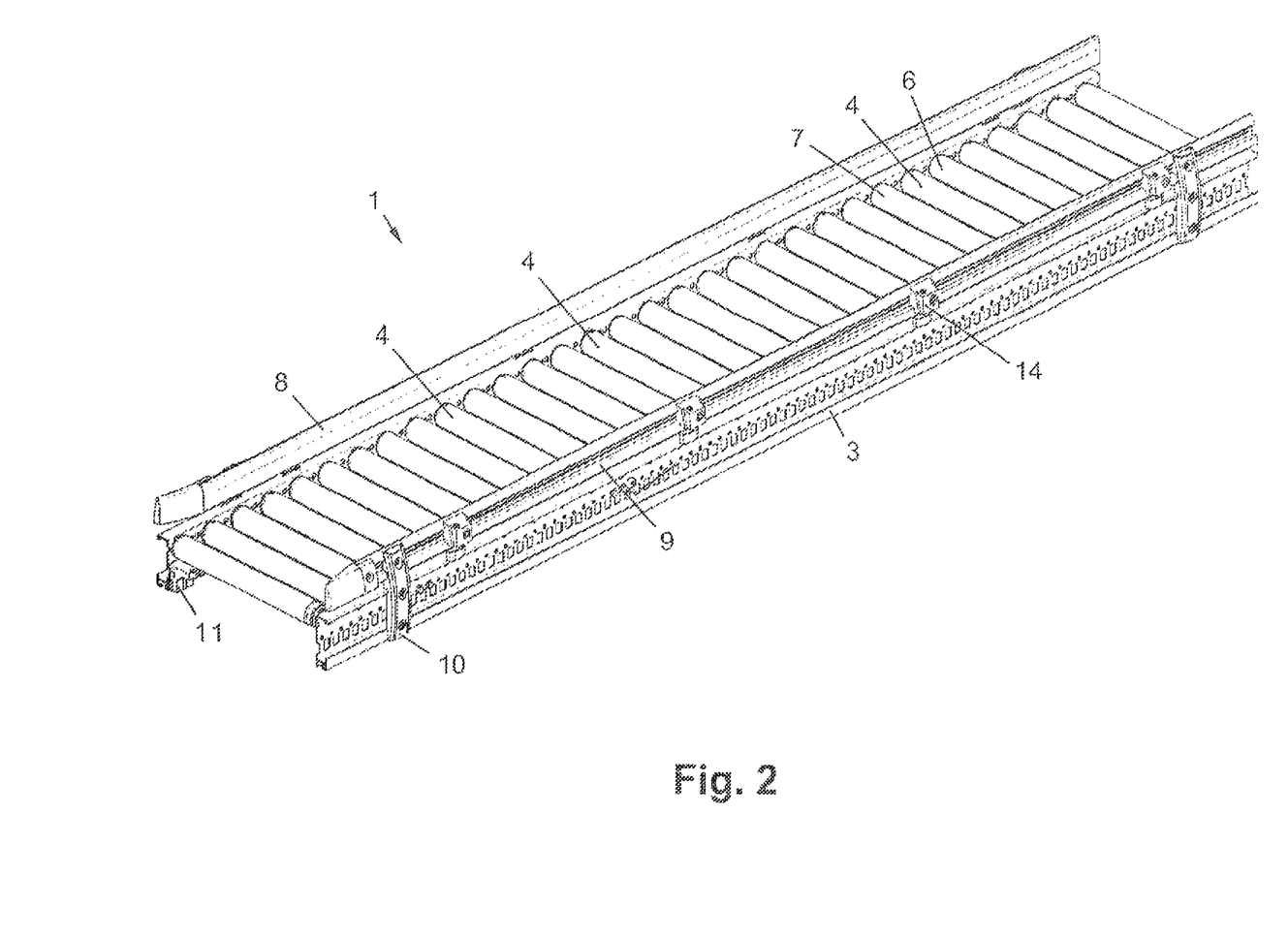
FIG. 2 is the same as FIG. 1 but viewed at an angle from behind.
Figure 3:
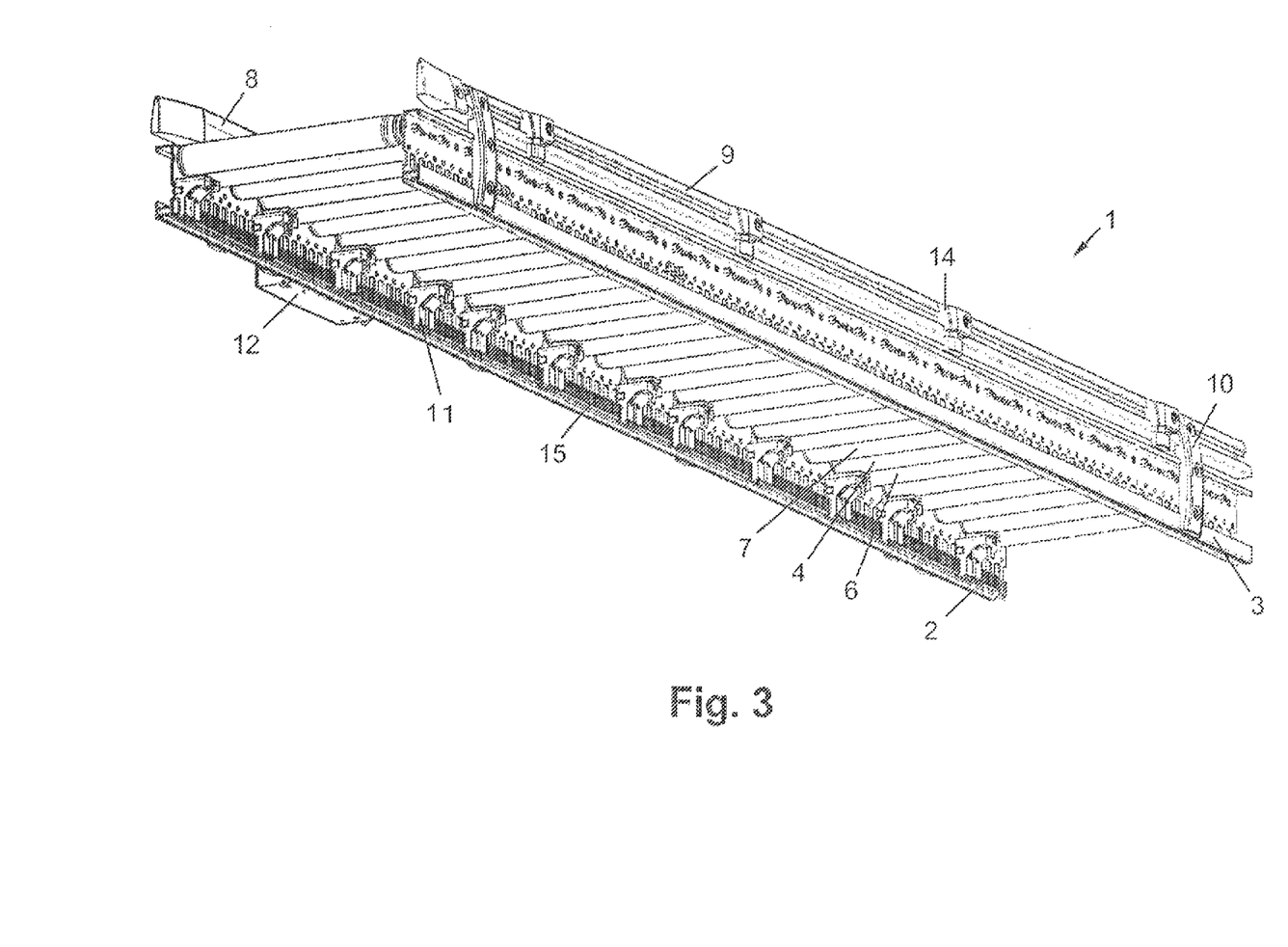
FIG. 3 is the same as FIG. 1 but viewed at an angle from underneath.

FIG. 2 shows the conveyor system 1 already illustrated in FIG. 1 but viewed at an angle from behind whilst FIG. 3 shows a view at an angle from underneath. Accordingly, the power supply bus 15 running along the inside of the frame profile 2 can also be seen in addition.

Figure 4:
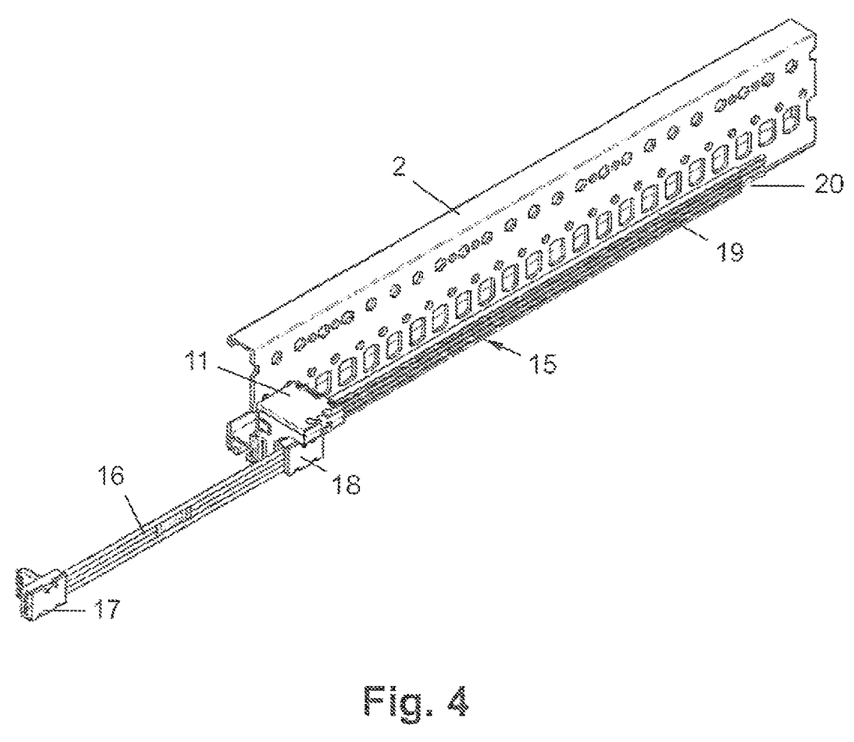
FIG. 4 illustrates a frame profile with a power supply bus disposed on it, a connection box for a conveyor roller with a connecting cable for connecting different sections of the power supply bus.

FIG. 4 illustrates a detail of the conveyor system 1, specifically frame profile 2 with the power supply bus 15 disposed on it, a connection box 11 and a connecting cable 16 which connects different sections of the power supply bus 15 to one another. To this end, plugs 17 and 18 are provided on the connecting cable 16 which can be plugged into the connection boxes 11. As may also be seen in FIG. 4, the power supply bus 15 comprises an insulator 19 running along the frame profile 2 with several receptacles which are open on the longitudinal side in which several electric conductors 20 are disposed, one electric conductor 20 respectively being mounted in one receptacle in each case. The electric conductors 20 are electrically connected to drive electronics of the conveyor rollers 4 via the connection boxes 11. Each (motorized) conveyor roller 4 is advantageously provided with a connection box 11 and each connection box 11 is connected to the electric conductors 20. Naturally, it would also be conceivable to provide one connection box 11 for several conveyor rollers 4.

Figure 5:
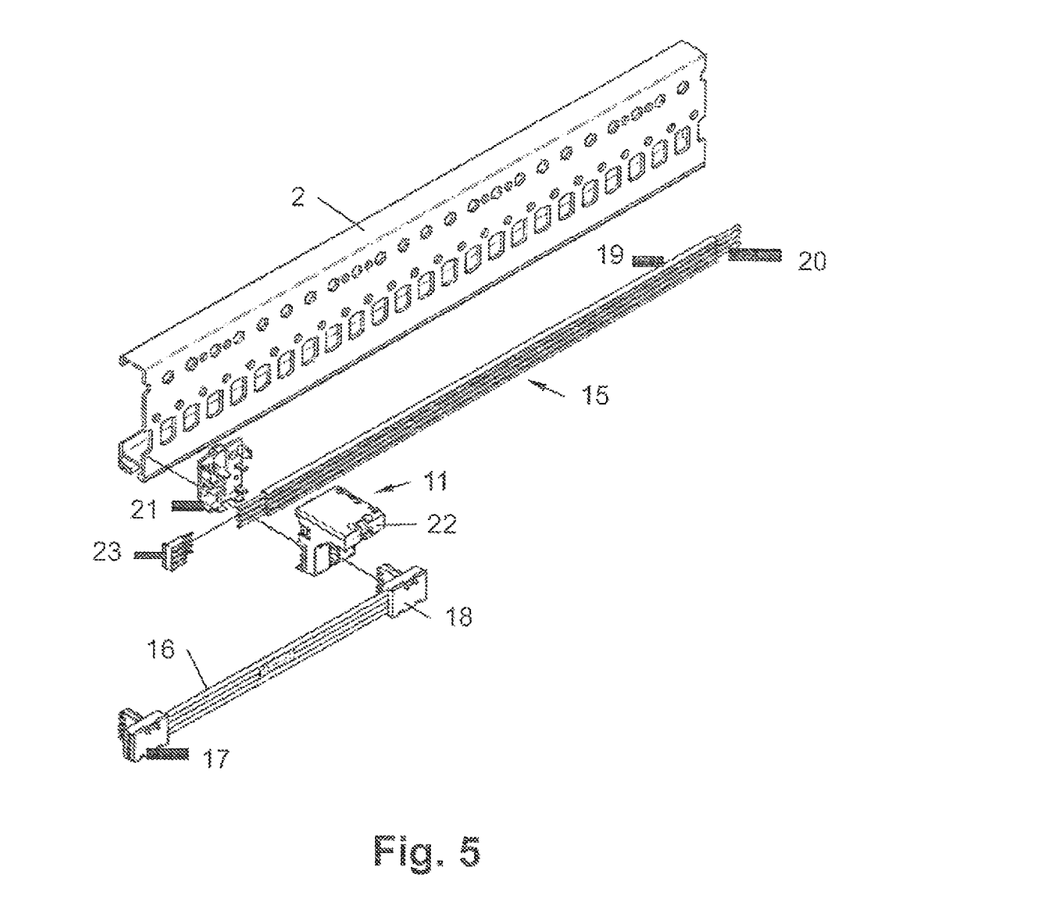
FIG. 5 is the same as FIG. 4 but in an exploded diagram.

FIG. 5 illustrates the same detail of the conveyor system 1 as that shown in FIG. 4 but in an exploded diagram. As may be seen from FIG. 5, the connection box 11 comprises a base plate 21 and a plug-in part 22. In addition, the power supply bus 15 may be terminated with an end cap 23.

When building the conveyor system 1, the base plates 21 are secured on/in the frame profile 2 first of all (e.g. clipped on by means of a catch connection). Then the power supply bus 15 is mounted and contacted by plugging in the plug-in parts 22, in particular to the drive electronics for the conveyor roller 4 (see also FIGS. 11 to 13). Different sections of the power supply bus 15 can finally be connected to one another by plugging in a connecting cable 16.

Figure 6:
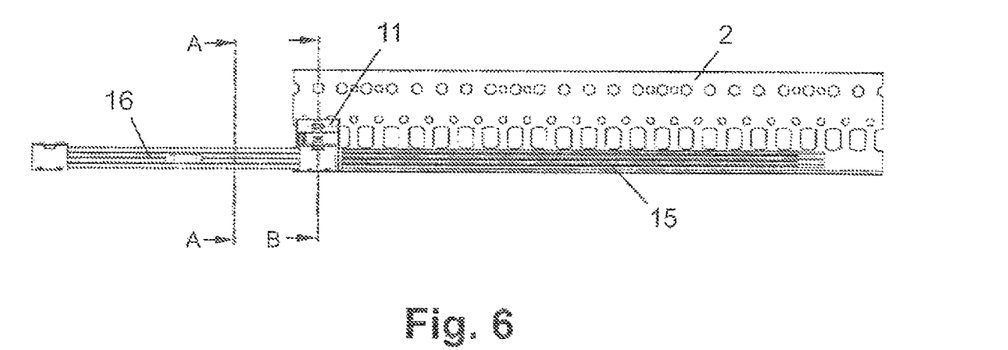
FIG. 6 is the same as FIG. 4 but from a side view.
Figure 7:
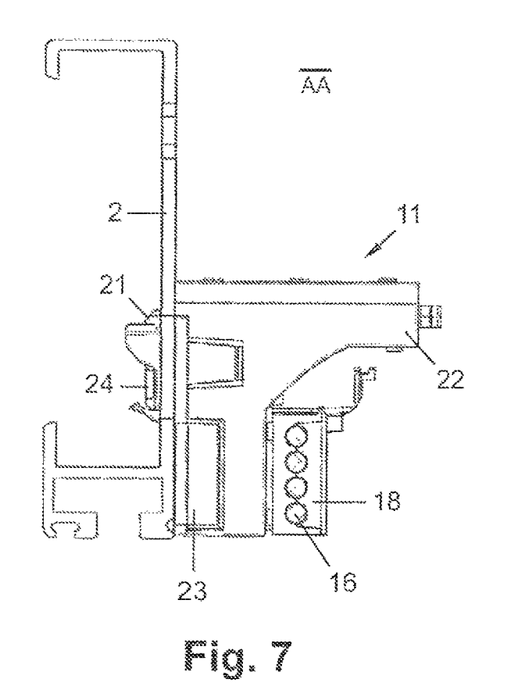
FIG. 7 is a section through the connecting cable and a front view of the arrangement illustrated in FIG. 4.
Figure 8:
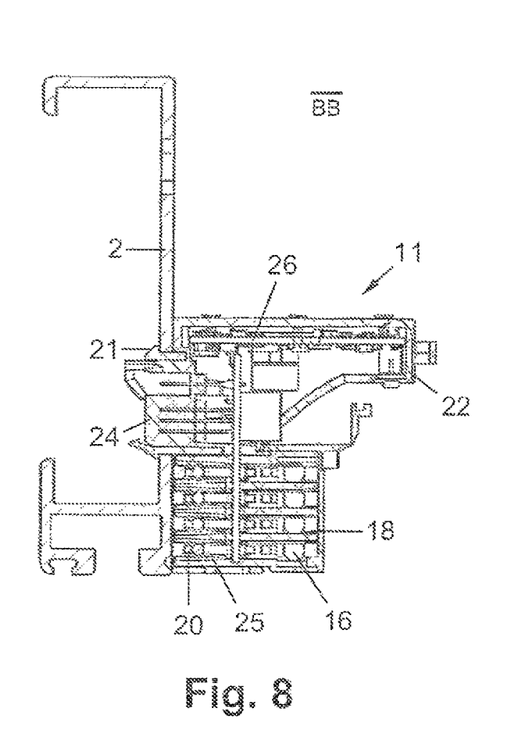
FIG. 8 is a section through the arrangement illustrated in FIG. 4 at the level of the connection box.

FIG. 6 illustrates the arrangement shown in FIGS. 4 and 5 but this time in a side view, FIG. 7 shows a cross section AA and FIG. 8 a cross section BB. FIGS. 7 and 8 clearly illustrate the base plate 21 extending through the frame profile 2 and its clip-on connection in the frame profile 2. Also illustrated is a plug 24 of a data bus which is disposed on the outside of the frame profile 2 and hence lying opposite the power supply bus 15 (see also FIGS. 14 and 15).

In FIG. 8, contacts 25 of the plug 18 may also be seen, which are spring-loaded and extend around the electric conductors 20. Finally, a circuit board 26 is disposed in the connection box 11 with an electronic circuit disposed on it which, amongst other things, communicates with the controller 12 and the drive controller of the conveyor roller 4. The electric conductors 20 in this example are of an identical design. In principle, however, it would also be conceivable to use different electric conductors 20, in particular with different cross sections.

Figure 9:
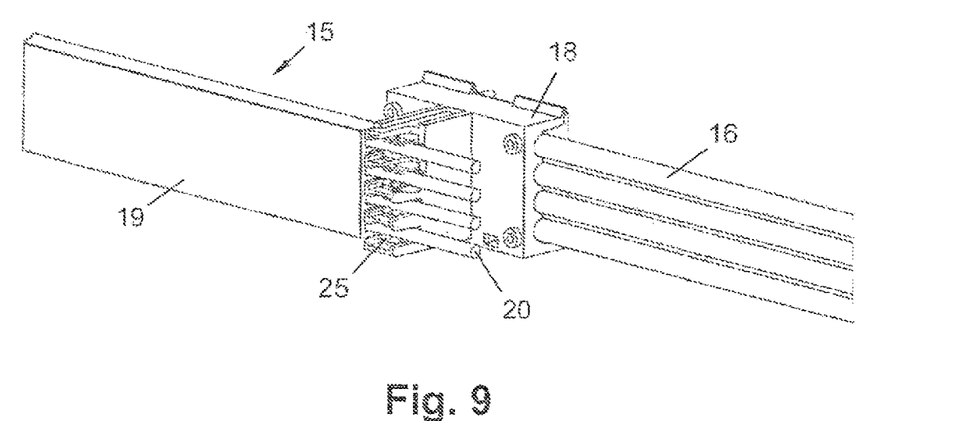
FIG. 9 illustrates the power supply bus with the connecting cable isolated viewed at an angle from behind.
Figure 10:
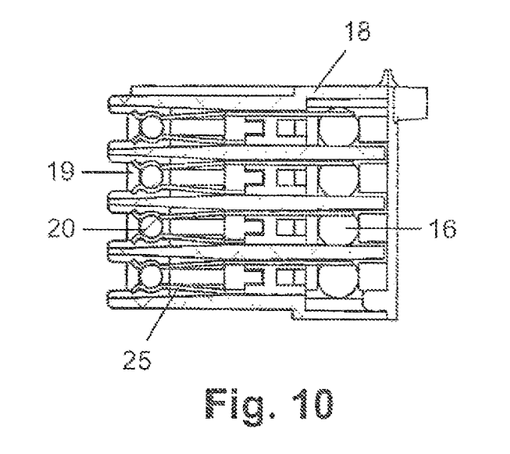
FIG. 10 is the same as FIG. 9 but in cross section.

FIG. 9 illustrates the power supply bus 15 with the connecting cable 16, viewed isolated at an angle from behind and FIG. 10 shows the same arrangement in section. In FIGS. 9 and 10, it may be seen particularly clearly that the cross section of the electric conductors 20 is circular. However, this is absolutely not a necessary condition. The cross section could also be approximately square, square, hexagonal or octagonal as well as oval (e.g. elliptical) or approximately circular, for example.

Generally speaking, the form factor f of the electric conductor 20, which is defined as the quotient of the circumference of a circle equivalent in area to the cross section of the electric conductor 20, and the circumference of said cross section of the electric conductor 20, is within the range of f=0.88 to f=1.00. If the electric conductor 20 has a circular cross section, then the form factor will be f=1.00.

If the electric conductor 20 has a square cross section of 1 mm×1 mm for example, its surface area A=1 mm² and its circumference U=4 mm. The diameter of the circle equivalent in area is $$d = \sqrt{\frac{4 \cdot A}{\pi}} = \sqrt{\frac{4}{\pi}} = 1.13 \text{ mm}$$

Its circumference U is $$U = d \cdot \pi = 1.13 \cdot \pi = 3.54 \text{ mm}$$

The form factor f is therefore $$f = \frac{U_K}{U_L} = \frac{3.54}{4.00} = 0.89$$

As may also be seen in particular from FIG. 9, the spring-loaded contacts 25 extending round the electric conductors 20 each have several contact blades extending transversely to the electric conductor 20 and spaced apart from one another in the longitudinal direction of the electric conductor 20. This enables electrical resistance to be reduced because the contact blades are effectively able to compensate for unevenness and electrically act as individual contacts connected in parallel. Individual contact blades advantageously also improve the electrical contact if the conveyor track and hence the power supply bus 15 runs in a curved shape.

It is of advantage if—as may be seen from FIG. 10—the free bend length of the contact 25 or contact blades approximately corresponds to three times to four times the diameter of said circle equivalent in area. This represents a good comprise between the current carrying capacity of the contact 26 and its bearing strength on the electric conductor 20.

Figure 11:
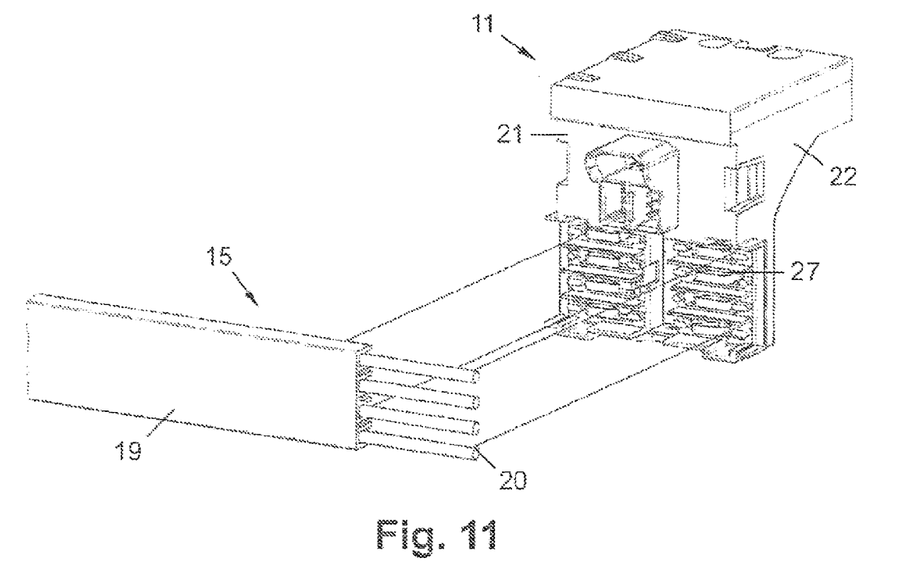
FIG. 11 illustrates the power supply bus with a connection box isolated viewed at an angle from behind.

FIG. 11 in turn illustrates the power supply bus 15 isolated at an angle from behind but in this instance connected to a connection box 11. Based on this embodiment, the drive electronics are disposed inside the connection box 11 and are electrically connected to the contacts 27. The electrical connection to the drive electronics of the conveyor rollers 4 in this instance is established with the aid of contacts 27 lying in a spring-loaded arrangement on the electric conductors 20 (e.g. by contact bridges as illustrated in FIG. 11). In this respect, it is of particular advantage if—as illustrated in FIG. 11—several (in this instance specifically two) contacts 27 are provided for each electric conductor 20, which are electrically connected inside the connection box 11. The contacts 27 may be made from a single copper strip, for example. By using several contacts 27 lying one after the other in the longitudinal direction of the electric conductors 20, contact can still be made even if unevenness occurs in the run of the electric conductor 20 or if the power supply bus 15 is run in a curved shape, e.g. in a curve of the conveyor track.

Figure 12:
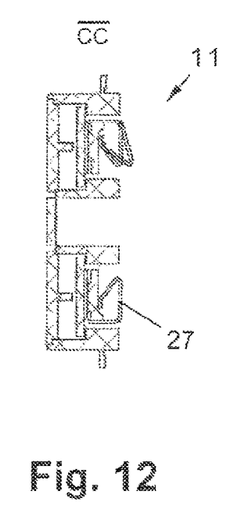
FIG. 12 shows a connection box in section.
Figure 13:
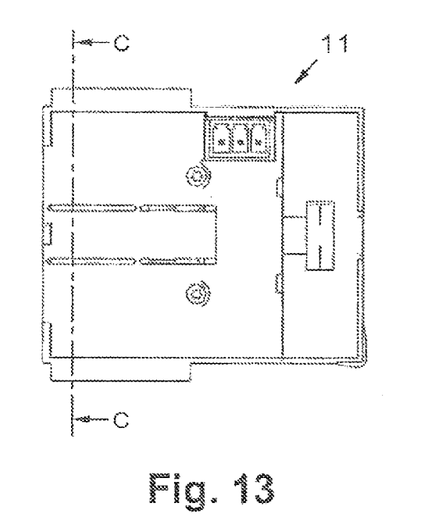
FIG. 13 is a front view of the connection box from FIG. 12.

FIGS. 12 and 13 illustrate the connection box 11 in detail (FIG. 12 in section, FIG. 13 showing a front view). The contacts 27 lying on the electric conductors 20 in a spring-loaded arrangement may be seen particularly clearly in FIG. 12. For the top contact 27 illustrated in FIG. 12, two positions are shown, one being the non-loaded position and one being the position assumed when lying on the electric conductor 20.

The contacts 27 illustrated in FIGS. 11 to 13 lie linearly on the electric conductors 20. It would naturally also be conceivable for them to lie on them locally at a specific point or flat.

Figure 14:
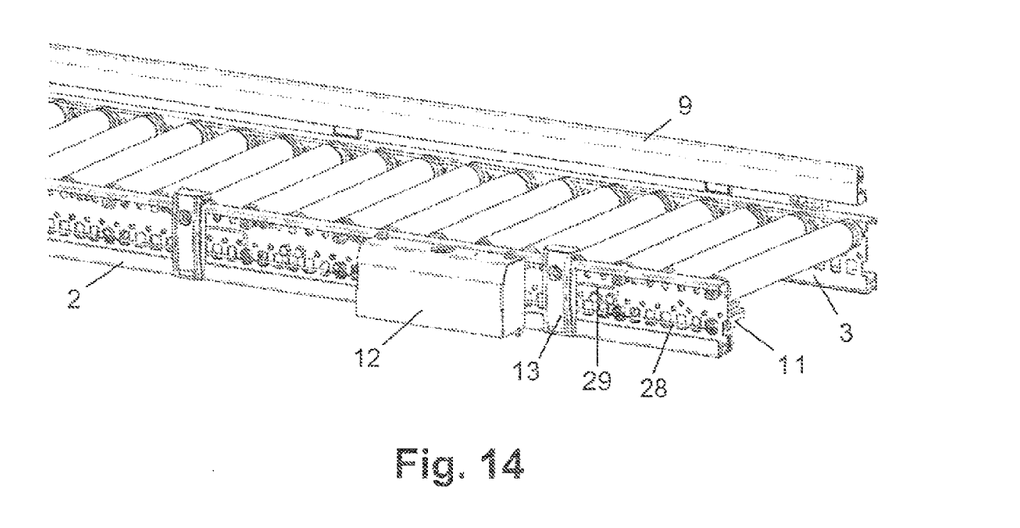
FIG. 14 is a detail of a conveyor system with a data bus and cabling to a photodetector and FIG. 15 is the same as FIG. 14 but in a partially exploded diagram.

FIG. 14 shows a detail of the conveyor system 1 already illustrated in FIGS. 1 to 3 but with the guide rail 8 omitted and additionally showing the data bus 28 and cabling 29 to the photodetector 13.

Figure 15:
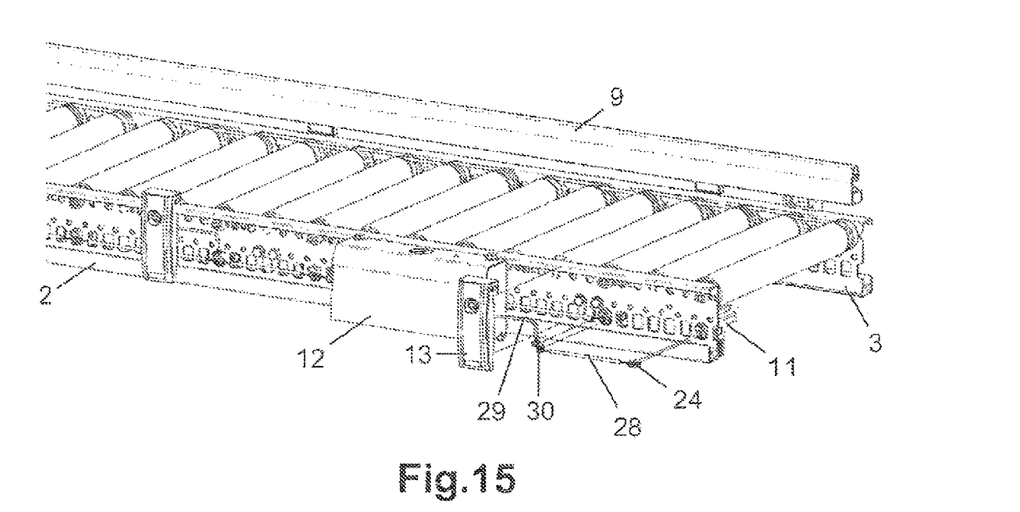

FIG. 15 illustrates the arrangement from FIG. 14, this time in a partially exploded diagram. Specifically illustrated is a photodetector 13 together with cabling 29 and the plug 30 mounted on it but disconnected. Also illustrated is a segment of the data bus 28 disconnected, so that the plugs 24 mounted on the ends of the segment can clearly be seen. Plugs 24 and 30 can be connected into the part of the base plate 21 of the connection box 11 which extends through the frame profile 2. By contrast with the power supply bus 15 which electrically connects several connection boxes 11 without interruption, the data bus 28 is laid in a chain-type arrangement. As may clearly be seen from FIGS. 14 and 15, a photodetector 13 is not connected to every connection box 11 and instead, the latter are provided along the conveyor system 1 where needed.

The embodiments illustrated as examples represent possible variants of a conveyor system 1 and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

In particular, it should be noted that in reality, the conveyor system 1 may also comprise more or fewer components than those illustrated.

For the sake of good order, finally, it should be pointed out that, in order to provide a clearer understanding of the structure of the conveyor system 1, it and its constituent parts are illustrated to a certain extent out of scale and/or on an enlarged scale and/or on a reduced scale.

The objective underlying the independent inventive solutions may be found in the description.

LIST OF REFERENCE NUMBERS

1 Conveyor system
2, 3 Frame profile
4 Motorized conveyor roller
5 Drive belt
6, 7 Non-motorized conveyor roller
8, 9 Guide rail
10 Mounting bracket
11 Connection box
12 Controller
13 Photodetector
14 Reflector
15 Power supply bus
16 Connecting cable
17, 18 Plug of connecting cable
19 Insulator
20 Electric conductor 21 Base plate
22 Plug-in part
23 End cap
24 Data bus plug
25 Contact plug for connecting cable
26 Circuit board with electronic circuit
27 Contact connection box
28 Data bus
29 Cabling for photodetector
30 Plug of photodetector cabling

The invention claimed is:

1. Conveyor system (1), comprising
two frame profiles (2, 3) which run such that they are spaced apart from one another,
a plurality of motorized conveyor rollers (4) arranged in between,
an insulator (19) which runs along the at least one frame profile (2) and
a plurality of electric conductors (20) which are arranged in the insulator (19) and are electrically connected to drive electronics of the conveyor rollers (4), and,
the form factor f of an electric conductor (20), which is defined as a quotient of the circumference of a circle which is equivalent in area to the cross section of the electric conductor (20) and of the circumference of said cross section of the electric conductor (20), is in the range of from f=0.88 to f=1.00, and
a connection box (11) for a motorized conveyor roller (4) or a connection box (11) for a plurality of motorized conveyor rollers (4), and the drive electronics for the motorized conveyor roller (4) are disposed directly in the conveyor roller (4) or in the connection box and the connection box (11) is disposed separately from the conveyor roller (4),
wherein
the insulator (19) comprises a plurality of receptacles which are open on the longitudinal side and in each case one electric conductor (20) is mounted in each case in one receptacle, and
the connection box (11) is equipped with contacts (27) which lie on the electric conductors (20) in a spring-loaded and local, linear or flat arrangement to establish an electrical connection to the drive electronics of the conveyor roller (4).

2. Conveyor system (1) according to claim 1, wherein the cross section of an electric conductor (20) is Polygonal, in particular of a regular polygonal shape.

3. Conveyor system (1) according to claim 1, wherein the cross section of an electric conductor (20) is oval, in particular circular.

4. Conveyor system (1) according to claim 1, wherein several spring-loaded and local, linear or flat contacts (27) are provided for each electric conductor (20).

5. Conveyor system (1) according to claim 1, wherein the electrical connection of several sections of electric conductors (20) is established with the aid of spring-loaded contacts (25) extending around the electric conductors (20).

6. Conveyor system (1) according to claim 5, wherein the contacts (25) respectively comprise several contact blades extending transversely to the electric conductors (20) and spaced apart from one another in the longitudinal direction thereof.

7. Conveyor system (1) according to claim 1, wherein the insulator (19) running along the frame profile (2) having the plurality of receptacles which are open on the longitudinal side and the electric conductors (20) forms a power supply bus (15) and the connection box (11) comprises a base plate (21) and a plug-in part (22), and the base plate (21) is secured on the frame profile (2) or in the frame profile (2) and the power supply bus (15) is disposed between the base plate (21) and the plug-in part (22).

8. Conveyor system (1), comprising
two frame profiles (2, 3) which run such that they are spaced apart from one another,
a plurality of motorized conveyor rollers (4) which are arranged in between,
an insulator (19) which runs along the at least one frame profile (2) and
a plurality of electric conductors (20) arranged in the insulator (19) which are electrically connected to the drive electronics of the conveyor rollers (4), and the form factor f of an electric conductor (20), which is defined as a quotient of the circumference of a circle which is equivalent in area to the cross section of the electric conductor (20), and of the circumference of said cross section of the electric conductor (20), is in the range from f=0.88 to f=1.00, and
a connection box (11) for a motorized conveyor roller (4) or a connection box (11) for a plurality of motorized conveyor rollers (4),
wherein
the insulator (19) comprises a plurality of receptacles which are open on the longitudinal side and in each case one electric conductor (20) is mounted in each case in one receptacle, and the insulator (19) with the plurality of receptacles open on the longitudinal side and the electric conductors (20) forms a power supply bus and (15), and
different sections of the power supply bus (15) are connected to one another by means of a connecting cable (16), and the connecting cable (16) is provided with plugs (17, 18) Which can be plugged into the connection boxes (11), and
the plugs (17, 18) comprise contacts (25) extending round the electric conductors (20) for establishing the electrical connection of several sections and electric conductors (20).

* * * * *

UNITED STATES PATENT AND TRADEMARK OFFICE
CERTIFICATE OF CORRECTION

PATENT NO. : 9,511,938 B2  
APPLICATION NO. : 15/028061  
DATED : December 6, 2016  
INVENTOR(S) : Reischl Page 1 of 1

It is certified that error appears in the above-identified patent and that said Letters Patent is hereby corrected as shown below:

In the Claims

In particular, in Column 7, Line 46, (Line 2 of Claim 2) please change "Polygonal" to correctly read: --polygonal--.

Signed and Sealed this
Twenty-first Day of March, 2017

Michelle K. Lee
*Director of the United States Patent and Trademark Office*